United States Patent [19]

Brossaud et al.

[11] Patent Number: 4,731,832
[45] Date of Patent: Mar. 15, 1988

[54] PROCESS AND APPARATUS FOR CONTROL OF A HANDS-FREE TELEPHONE SET OPERATING IN ALTERNATION BETWEEN SENDING AND RECEIVING

[75] Inventors: Serge Brossaud, St Romain; Laurent Terrier, Blanzy, both of France

[73] Assignee: Jeumont-Schneider Corporation, Puteaux, France

[21] Appl. No.: 833,056

[22] Filed: Feb. 24, 1986

[30] Foreign Application Priority Data

Feb. 27, 1985 [FR] France ................................ 85 02828

[51] Int. Cl.$^4$ ............................................. H04M 9/08
[52] U.S. Cl. ..................................... 379/389; 379/388
[58] Field of Search ............... 179/170.2, 170.6, 170.8, 179/100 L, 81 B; 379/389, 390, 387, 388, 420, 406, 407, 409, 395

[56] References Cited

U.S. PATENT DOCUMENTS

| | | | |
|---|---|---|---|
| 3,952,166 | 4/1976 | Kato et al. | 379/389 |
| 4,317,959 | 3/1982 | Kuriki | 379/390 |
| 4,400,581 | 8/1983 | Jacobson | 379/395 |
| 4,488,007 | 12/1984 | Chataignon et al. | 379/395 |
| 4,507,524 | 3/1985 | Yun | 379/389 |
| 4,542,263 | 9/1985 | Mitani | 379/390 |

FOREIGN PATENT DOCUMENTS 2466150 3/1981 France .

Primary Examiner—Jin F. Ng
Assistant Examiner—R. Vaas
Attorney, Agent, or Firm—Rines and Rines, Shapiro and Shapiro

[57] ABSTRACT

The invention concerns a process and an apparatus to initiate the reversal of an inverter controlling the placement of a so-called hands-free telephone set in a reception mode or a transmission mode. According to the invention, the position of the inverter (8) is a function of the sign of the difference between the amplitudes of the integrated analog emitted signal and the integrated analog received signal. By preference, the received signal is drawn downstream (from the received-signal output) of the inverter, while the emitted signal is drawn upstream (from the emitted-signal input) of the inverter (8). A second received signal is drawn upstream of the inverter (from the received-signal input) so as to nullify the delay imparted to the change in position of the inverter if the amplitude of the corresponding integrated signal becomes significant.

15 Claims, 1 Drawing Figure

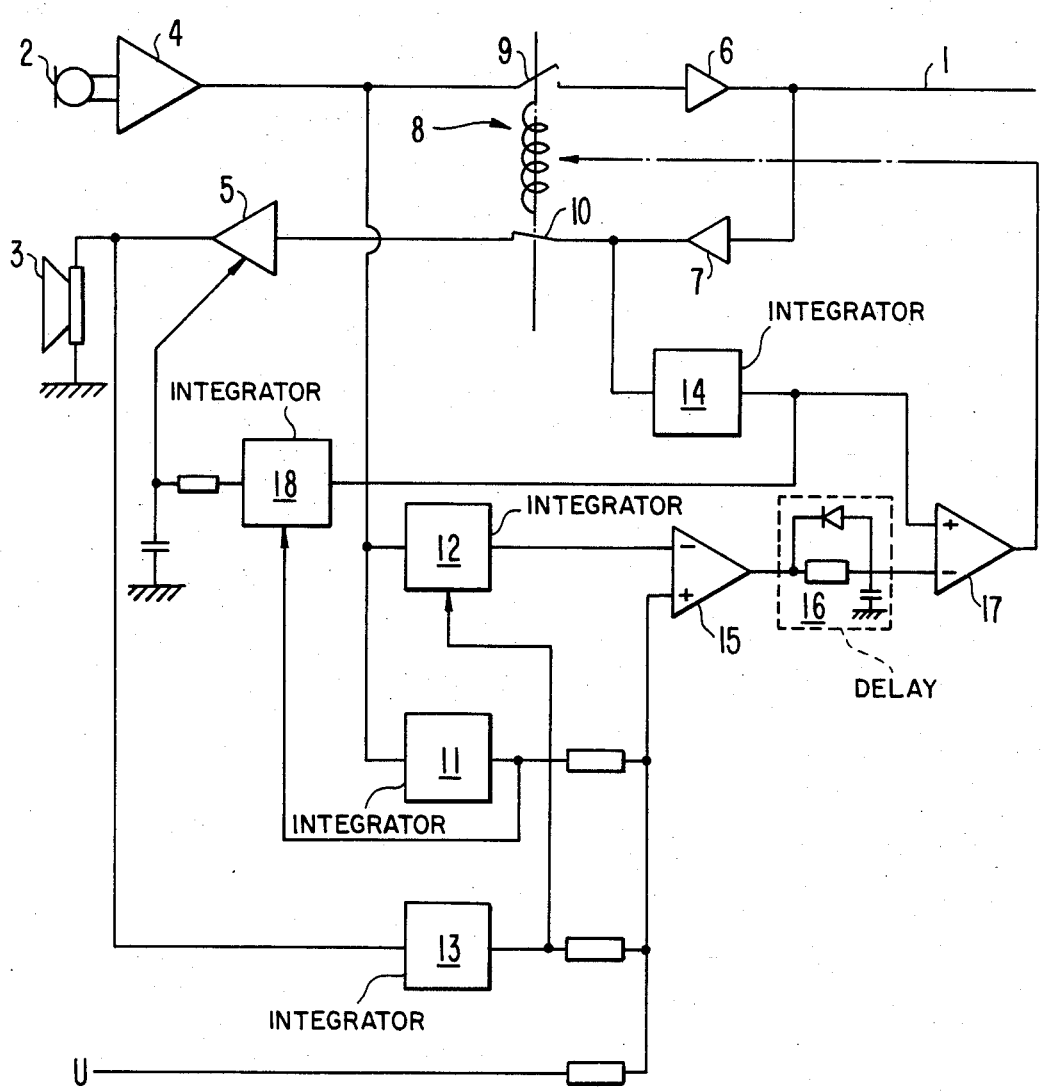

PROCESS AND APPARATUS FOR CONTROL OF A HANDS-FREE TELEPHONE SET OPERATING IN ALTERNATION BETWEEN SENDING AND RECEIVING

The present invention concerns so-called hands-free telephone sets, operating in alternation, and more particularly, a process and an apparatus to initiate the reversal of an inverter controlling the placement of such telephone sets in the receiving mode or the sending mode. A telephone set is said to be hands-free when it is not necessary to hold its microphone and speaker respectively before the mouth and the ear of the user.

However, in such a case, there is no acoustic screen between the microphone and the speaker, and very rapidly, a Larsen effect results.

Various solutions have been investigated to obviate this drawback. The French Pat. No. 2,466,150, for example, described a system enabling the set to operate in duplex. Such solutions are generally quite costly, and are not really justified, because two people in conversation very rarely speak simultaneously.

A simple solution consists in having the telephone set operate in simplex. However, in this case, an automatic unit, if possible, must decide the direction of transmission of signals. This unit must in practice be the result of a compromise, since the signal emitted by the microphone also must contain ambient local noise as well as speech, while the signal received by the speaker must also contain line noises, as well as speech, with an attenuation ratio which is not predictable.

The present invention has the object of palliating these problems so as to enable good functioning of a telephone set in alternation between sending and receiving, whatever the quality of the signals sent or received, whatever the relative position of the microphone and speaker, and whatever the acoustic characteristics of the telephone set and the unit in which it is installed.

Reference will be made below to an inverter for controlling the placement of the telephone set in the reception state or the transmission state. It is obvious that this expression defines a function which can be carried out by any means, for example, by controlling a maximum attenuation of the signal on the line not in use.

In summary, in accordance with the present invention, the position of the inverter is a function of the sign of the difference between the amplitude values of the analog signal emitted, and the analog signal received. Preferably, the received signal is drawn from downstream of the inverter (from the received-signal output side of the inverter), while the emitted signal is drawn from upstream of the inverter (from the emitter-signal input side of the inverter), the amplitude values being provided by integrators.

Preferably, a delay will be introduced in the receiving position of the inverter, while a second received signal is drawn upstream of the inverter (the received-signal input side of the inverter) to cancel the delay in certain cases.

By preference, a continuous signal of low amplitude will be added to one of the integrated signals, so that the inverter will be in a determined condition at rest.

Further, the integrated received signal is preferably also utilized to control the gain of the integrator of the emitted signal under certain conditions, particularly to reduce the influence of the integrated emitted signal during a brief instant at the start of each newly received signal.

Again by preference, a second integrated emitted signal is added to the integrated received signal, with a larger time constant, in order to control the threshold of reversal of the inverter.

The invention will be better understood, and other goals, advantages, and characteristics of the invention, will be made more clear by the following description of an apparatus implementing the process, which description is presented in a non-limitational sense, and to which is appended a sheet of drawings.

The single FIGURE represents schematically an apparatus conforming to the present invention.

Referring to the FIGURE, there is schematically represented one of the two wires 1 connecting the telephone set to an autocommutator, not represented. The telephone unit includes a microphone 2 and a speaker 3, connected respectively to signal amplification circuits 4,5 and to other circuits 6,7 of the telephone set.

An inverter 8 is schematically represented by a coil and two interrupters 9,10. The coil controls the opening and closing, or closing and opening, of the interrupters 9,10, which are arranged in series in the sending and receiving lines, respectively.

It will be understood that, to avoid any Larsen effect, one of the interrupters must be open when the other is closed.

Quite obviously, such an interrupter can be realized electronically by means of switches as well as by means of controlled attenuation circuits.

The emitted signal is drawn upstream of the inverter 8—that is, at the emitted-signal input side of the inverter or, more specifically, the input side of interrupter 9. A first received signal is drawn downstream of this inverter, at the received-signal output side of the inverter or, more specifically, the output side of interrupter 10; and a second received signal is drawn upstream of this inverter (input side of interrupter 10). The emitted signal is applied to an integrator 11 and to an integrator 12, while the first received signal, drawn downstream, is applied to an integrator 13, and the second received signal, drawn upstream, is applied to an integrator 14.

Such integrators may be constituted, for example, by an operational amplifier, whose input and output terminals are shunted by a diode provided with a resistance in parallel, and with the output terminal connected to ground through a condenser, in practice delivering a continuous rectified signal which is a function of the peak value of the input signal.

The time constant of the integrators 12, 13 and 14 is relatively small (less than 10 milliseconds), while that of the integrator 11 is relatively large (5 to 10 seconds). The output terminal of the integrator 12 is connected to one terminal of a comparator 15, to the other input terminal of which is applied the sum of the output signals of the integrators 11 and 13, and, possibly, a continuous signal of low amplitude, intended to raise slightly the threshold of the comparator 15, and thus to place the inverter 8 in the receiving condition when there is no signal and the set is at rest. The output of the comparator 15 is connected to a delay circuit 16 presenting a sufficient time constant in one direction so that the inverter will not reverse between syllables, for example of the order of 200 milliseconds, and very small in the other direction, so the the time of passage from rest to the emitting condition will be very short, thus avoiding the loss of the first syllable of the first word pronounced before the microphone 2. The output terminal of the integrator 14 is connected to an input terminal of a second comparator 17, to the other input terminal of which is applied the signal issuing from the delay circuit 16.

The change of sign of the output signal of this second comparator 17 can thus be utilized directly to control the reversing of the inverter 8.

The output terminal of the integrator 14 is also connected to an integrator 18, whose output signal serves to diminish the gain of the amplifier 5 when the signal received on the line 1 is too high; this control is moderated by the output signal of the integrator 11.

To describe the functioning of this apparatus, it is first necessary to specify that the two integrators 12 and 13 are indispensible. In fact, with a relatively short time constant, they enable comparison at each instant of the amplitude of the signals in the reception and emission lines.

Taking as a hypothesis that at the initial moment there is no signal on the line 1, the inverter is placed at rest in the reception position. This is obtained by means of a continuous signal added to the received signal integrated at 13 so as to raise the threshold of the comparator 15.

If a signal appears in reception, it is integrated at 13, and the sign of the output signal of the comparators 15 and 17 does not change.

If a signal appears in emission, it is integrated at 12, and is compared at 15 with the integrated received signal. If it presents a sufficient amplitude, the output signal of the comparator 15 changes sign, and is applied to the second comparator 17. Since it presents an amplitude greater than that of the integrated received signal, the signal issuing from the second comparator changes sign, which commands reversal of the inverter 8. At this instant, the interrupter 9 is closed, and the interrupter 10 is opened. The integrator 13 no longer receives a signal.

If there is no longer a signal emitted, the output signal of comparator 15 changes sign again due to the earlier mentioned continuous signal applied to the comparator. This change of sign is transmitted to the comparator 17 after a certain delay necessary to avoid re-reversal of the inverter 8 if the absence of emitted signal corresponds to a normal pause between two syllables. if, before the end of the time constant of the delay circuit 16, a significant signal appears on the line 1, not due to the microphone 2, the output signal of the integrator 14 enables more rapid reversal to reception. To this end, the signal applied to the integrator 14 is drawn upstream of the inverter 8.

The role of the integrator 11, whose time constant is relatively large, is to increase the threshold of the comparator 15 as a function of the ambient noise around the microphone 2.

In effect, the signal issuing from it is substracted from the signal issuing from the integrator 12, and makes it possible to return to the reception position if necessary.

Finally, a distant caller does not risk being cut off due to the acoustic connection between the speaker 3 and the microphone 2, because the signal issuing from the integrator circuit 13 is utilized to lower the gain of the integrator 12 during a brief instant at the start of each newly received signal, so that the output signal of the comparator 15 cannot change sign inopportunely. This system must be extremely rapid, in order to intervene before the return of the echo from the speaker 3 to the microphone 2.

Although only a single preferred mode of the invention has been shown and described herein, it is obvious that various modifications may be made by those skilled in the art without departing from the framework of the present invention as specified in the claims which follow.

We claim:

1. In a hands-free telephone set having a sending line coupled to a microphone and a receiving line coupled to a speaker, the sending line and the receiving line being coupled to a common message transmission/reception line, apparatus for alternately switching said sending line and said receiving line to operate said telephone set alternately in a transmission mode and a receiving mode, said apparatus comprising:

inverter means having respective interrupter means connected in said sending line and in said receiving line, said inverter means being operable to switch said sending line and said receiving line in alternation, a first integrator having an input connected to said receiving line at a received-signal output side of said inverter means and an output connected to a first input of a comparator and applying integrated received signals to said first input of said comparator, and a second integrator having an input connected to said sending line at an emitted-signal input side of said inverter means and an output connected to a second input of said comparator, said comparator having an output connected to said inverter means and controlling switching of said inverter means to control switching of said telephone set from said transmission mode to said receiving mode and vice versa in accordance with the output state of said comparator, said output of said first integrator also being connected to a gain control input of said second integrator and being used to lower the gain of said second integrator instantaneously upon receipt of a message signal on said receiving line in order to prevent said comparator from switching from a state corresponding to said receiving mode to a state corresponding to said transmission mode due to acoustic coupling between said speaker and said microphone.

2. Apparatus according to claim 1, further comprising delay circuit means connected between said output of said comparator and a control input of said inverter means for preventing said comparator from causing switching of said inverter means from said transmission mode to said receiving mode during short pauses in message signals emitted on said sending line.

3. Apparatus according to claim 2, including an additional comparator and an additional integrator, said additional comparator having a first input connected to an output of said delay circuit means, a second input connected to an output of said additional integrator, and an output connected to said control input of said inverter means, said additional integrator having an input connected to said receiving line at a received-signal input side of said inverter means and facilitating rapid switching of said inverter means from said transmission mode to said receiving mode upon receipt of a message signal on said receiving line.

4. Apparatus according to claim 3, wherein said input of said first integrator is connected to an output of a received-signal amplifier connected in said receiving line at said received-signal output side of said inverter means, and wherein said output of said additional integrator is coupled to a gain control input of said received-signal amplifier, the output signal of said additional integrator being used to reduce the gain of said received-signal amplifier when an excessively high level message signal is received on said receiving line.

5. Apparatus according to claim 1, wherein said first and second integrators each have a relatively small time constant, said apparatus also including a further integrator with a relatively large time constant having an input connected to said sending line at said emitted-signal input side of said inverter means and an output connected to said first input of said comparator, whereby said further integrator compensates for ambient noise signals emitted on said sending line.

6. Apparatus according to claim 1, wherein a continuous signal is applied to one of said first and second inputs of said comparator to adjust a threshold of said comparator.

7. In a hands-free telephone set having a sending line coupled to a microphone and a receiving line coupled to a speaker, the sending line and the receiving line being coupled to a common message transmission/reception line, apparatus for alternately switching said sending line and said receiving line to operate said telephone set alternately in a transmission mode and a receiving mode, said apparatus comprising:

inverter means having respective interrupter means connected in said sending line and in said receiving line, said inverter means being operable to switch said sending line and said receiving line in alternation, a first integrator having an input connected to said receiving line at a received-signal output side of said inverter means and an output connected to a first input of a first comparator and applying integrated received signals to said first input of said first comparator, a second integrator having an input connected to said sending line at an emitted-signal input side of said inverter means and an output connected to a second input of said first comparator, a third integrator having an input connected to said receiving line at a received-signal input side of said inverter means, and a second comparator having a first input connected to an output of said first comparator, a second input connected to an output of said third integrator, and an output connected to said inverter means and controlling switching of said inverter means to control switching of said telephone set from said transmission mode to said receiving mode and vice versa in accordance with the output state of said second comparator, with said third integrator facilitating rapid switching of said second comparator from an output state corresponding to said transmission mode to an output state corresponding to said receiving mode upon receipt of a message signal on said receiving line.

8. Apparatus according to claim 7, further including a delay circuit connected between said output of said first comparator and said first input of said second comparator.

9. Apparatus according to claim 8, wherein said delay circuit presents a relatively large time constant when the output state of said first comparator changes from a state corresponding to said transmission mode to a state corresponding to said receiving mode and a relatively small time constant when the output state of said first comparator changes in the opposite manner.

10. Apparatus according to claim 7, wherein said first, second, and third integrators each have a relatively small time constant, said apparatus further including a fourth integrator with a relatively large time constant having an input connected to said sending line at said emitted-signal input side of said inverter means and an output connected to said first input of said first comparator, said fourth integrator compensating for ambient noise signals emitted on said sending line.

11. Apparatus according to claim 7, wherein said output of said first integrator is connected to a gain control input of said second integrator, the output signal of said first integrator being used to lower the gain of said second integrator instantaneously upon receipt of a message signal on said receiving line in order to prevent said first comparator from changing from a state corresponding to said receiving mode to a state corresponding to said transmission mode due to acoustic coupling between said speaker and said microphone.

12. In a hands-free telephone set having a sending line coupled to a microphone and a receiving line coupled to a speaker, the sending line and the receiving line being coupled to a common message transmission/reception line, apparatus for alternately switching said sending line and said receiving line to operate said telephone set alternately in a transmission mode and a receiving mode, said apparatus comprising:

inverter means having respective interrupter means connected in said sending line and in said receiving line, said inverter means being operable to switch said sending line and said receiving line in alternation, a first integrator with a relatively small time constant having an input connected to said receiving line at a received-signal output side of said inverter means and an output connected to a first input of a comparator and applying integrated received signals to said first input of said comparator, a second integrator with a relatively small time constant having an input connected to said sending line at an emitted-signal input side of said inverter means and an output connected to a second input of said comparator, said comparator having an output connected to said inverter means and controlling switching of said inverter means to control switching of said telephone set from said transmission mode to said receiving mode and vice versa in accordance with the output state of said comparator, and a third integrator with a relatively large time constant having an input connected to said sending line at said emitted-signal input side of said inverter means and an output connected to said first input of said comparator, said third integrator compensating for ambient noise signals emitted on said sending line.

13. Apparatus according to claim 12, further comprising delay circuit means connected between the output of said comparator and a control input of said inverter means for preventing said comparator from causing switching of said inverter means from said transmission mode to said receiving mode during short pauses in message signals emitted on said sending line.

14. Apparatus according to claim 13, including an additional comparator and an additional integrator, said additional comparator having a first input connected to an output of said delay circuit means, a second input connected to an output of said additional integrator, and an output connected to said control input of said inverter means, said additional integrator having an input connected to said receiving line at a received-signal input side of said inverter means and facilitating rapid switching of said inverter means from said transmission mode to said receiving mode upon receipt of a message signal on said receiving line.

15. Apparatus according to claim 14, wherein a continuous signal is applied to one of said first and second inputs of the first-mentioned comparator to adjust a threshold of that comparator.

* * * * *